United States Patent
Shiraishi

(10) Patent No.: US 8,994,928 B2
(45) Date of Patent: Mar. 31, 2015

(54) LASER RADAR DEVICE

(75) Inventor: Tatsuya Shiraishi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/002,023

(22) PCT Filed: Mar. 2, 2011

(86) PCT No.: PCT/JP2011/054797
§ 371 (c)(1),
(2), (4) Date: Aug. 28, 2013

(87) PCT Pub. No.: WO2012/117542
PCT Pub. Date: Sep. 7, 2012

(65) Prior Publication Data
US 2013/0342822 A1      Dec. 26, 2013

(51) Int. Cl.
| | | |
|---|---|---|
| G01S 17/88 | (2006.01) | |
| G01S 17/93 | (2006.01) | |
| G01S 7/481 | (2006.01) | |
| G02B 5/09 | (2006.01) | |
| G02B 26/12 | (2006.01) | |

(52) U.S. Cl.
CPC ............ *G01S 17/88* (2013.01); *G01S 17/936* (2013.01); *G01S 7/4817* (2013.01); *G02B 5/09* (2013.01); *G02B 26/12* (2013.01)
USPC .......... 356/4.01; 356/3.01; 356/4.1; 356/5.01

(58) Field of Classification Search
CPC ..... G01S 7/4817; G01S 17/42; G01S 17/936; G01C 3/08
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,317,202 B1 * | 11/2001 | Hosokawa et al. ........ 356/141.1 |
| 2005/0195383 A1 * | 9/2005 | Breed et al. .................. 356/4.01 |
| 2008/0040039 A1 | 2/2008 | Takagi | |

FOREIGN PATENT DOCUMENTS

| | | |
|---|---|---|
| JP | 2000 147124 | 5/2000 |
| JP | 2003 121546 | 4/2003 |
| JP | 2007 178140 | 7/2007 |
| JP | 2007 310595 | 11/2007 |
| JP | 2010 060299 | 3/2010 |
| JP | 2010 210324 | 9/2010 |

OTHER PUBLICATIONS

International Search Report Issued Apr. 5, 2011 in PCT/JP2011/054797 Filed Mar. 2, 2011.

* cited by examiner

*Primary Examiner* — Luke Ratcliffe
(74) *Attorney, Agent, or Firm* — Oblon, McClelland, Maier & Neustadt, L.L.P.

(57) ABSTRACT

A laser radar device mounted on a vehicle includes a first laser emission part configured to generate a measuring laser beam by using a laser beam emitted from a laser source and to illuminate a predetermined area in a front traveling direction and a second laser emission part configured to generate a measuring laser beam by using the laser beam emitted from the laser source. A beam spread angle, viewed from a side of the vehicle, of the measuring laser beam generated by the second laser emission part is larger than a beam spread angle, viewed from a side of the vehicle, of the measuring laser beam generated by the first laser emission part.

4 Claims, 10 Drawing Sheets

FIG.9
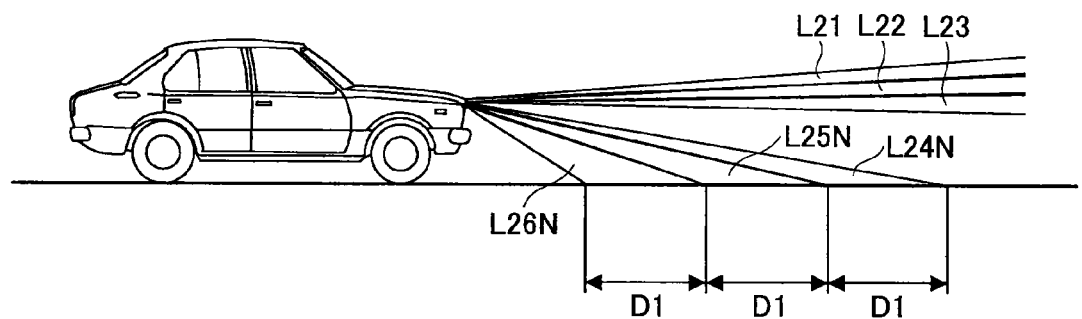
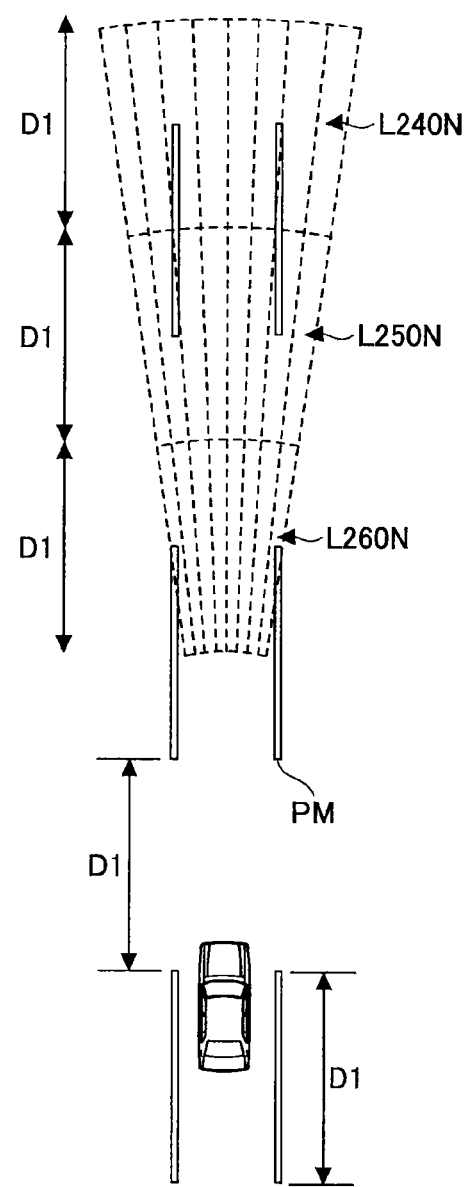

LASER RADAR DEVICE

TECHNICAL FIELD

The present invention relates to a laser radar device. In particular, the present invention relates to a laser radar device which irradiates both a predetermined area in front of a vehicle in a traveling direction of the vehicle and a predetermined area on a road surface.

BACKGROUND ART

Conventionally, an in-vehicle radar device which irradiates both a predetermined area in front of a vehicle and a predetermined area on a road surface is known (see Patent Document 1).

This in-vehicle radar device irradiates both the predetermined area in front of a vehicle and the predetermined area on a road surface by causing each of plural reflective surfaces of a rotating polygonal mirror to sequentially reflect a laser beam emitted from a single laser diode.

The plural reflective surfaces of the polygonal mirror includes five planar reflective surfaces used to irradiate the predetermined area in front of a vehicle in a traveling direction of the vehicle, and a concave reflective surface used to irradiate the predetermined area on a road surface.

When the in-vehicle radar device irradiates the predetermined area on a road surface, the in-vehicle radar device causes the concave reflective surface of the polygonal mirror to reflect downward and converge the light emitted from the laser diode so that an area on the road surface irradiated by the laser beam irradiation contracts.

In this way, while ensuring that the in-vehicle radar device irradiates a white line on a road surface with the laser beam, the in-vehicle radar device narrows down a beam divergence angle, contracts an irradiated area, and increases a power density within the irradiated area. As a result, the in-vehicle radar device improves a detection sensitivity of the white line on the road surface.

PRIOR ART DOCUMENTS

[Patent Document 1] JP2000-147124A

DISCLOSURE OF THE INVENTION

Problems to be Solved by the Invention

However, due to the contraction of the irradiated area by a single laser beam, if the in-vehicle radar device in Patent Document 1 is to scan the predetermined area on the road surface entirely, the in-vehicle radar device has to increase the number of scanning per unit time and the number of irradiations per unit time. Consequently, it increases a load on the laser diode and negatively affects a life of a laser source. Meanwhile, if the in-vehicle radar device does not increase the number of scanning per unit time and the number of irradiations per unit time, even if it can detect a white line which extends continuously in a traveling direction of the vehicle, it is likely to be unable to detect a road mark which is discontinuous in a traveling direction of the vehicle such as Botts' dots, a Cat's eye, a discontinuous road boundary line, or the like.

In view of the above-mentioned points, it is an object of the present invention to provide a laser radar device which irradiates both a predetermined area in front of a vehicle in a traveling direction of the vehicle and a predetermined area on a road surface, and which is able to detect a road mark on a road surface more reliably.

Means for Solving Problems

To achieve the object above, a laser radar device according to an embodiment of the present invention is a laser radar device mounted on a vehicle comprising a first laser emission part configured to generate a measuring laser beam by using a laser beam emitted from a laser source and to illuminate a predetermined area in a front traveling direction, and a second laser emission part configured to generate a measuring laser beam by using the laser beam emitted from the laser source and to illuminate a predetermined area on a road surface, wherein a beam spread angle, viewed from a side of the vehicle, of the measuring laser beam generated by the second laser emission part is larger than a beam spread angle, viewed from a side of the vehicle, of the measuring laser beam generated by the first laser emission part.

Effect of the Invention

Due to the above means, the present invention is able to provide a laser radar device which irradiates both a predetermined area in front of a vehicle in a traveling direction of the vehicle and a predetermined area on a road surface, and which is able to detect a road mark on a road surface more reliably.

BRIEF DESCRIPTION OF THE DRAWINGS

FIG. 9 is a diagram illustrating a yet another example of an area irradiated by a measuring laser beam which a laser beam generating device emits toward a road surface.

MODE FOR CARRYING OUT THE INVENTION

With reference to the figures, a mode for carrying out the present invention is described below.

First Embodiment

Figure 1:
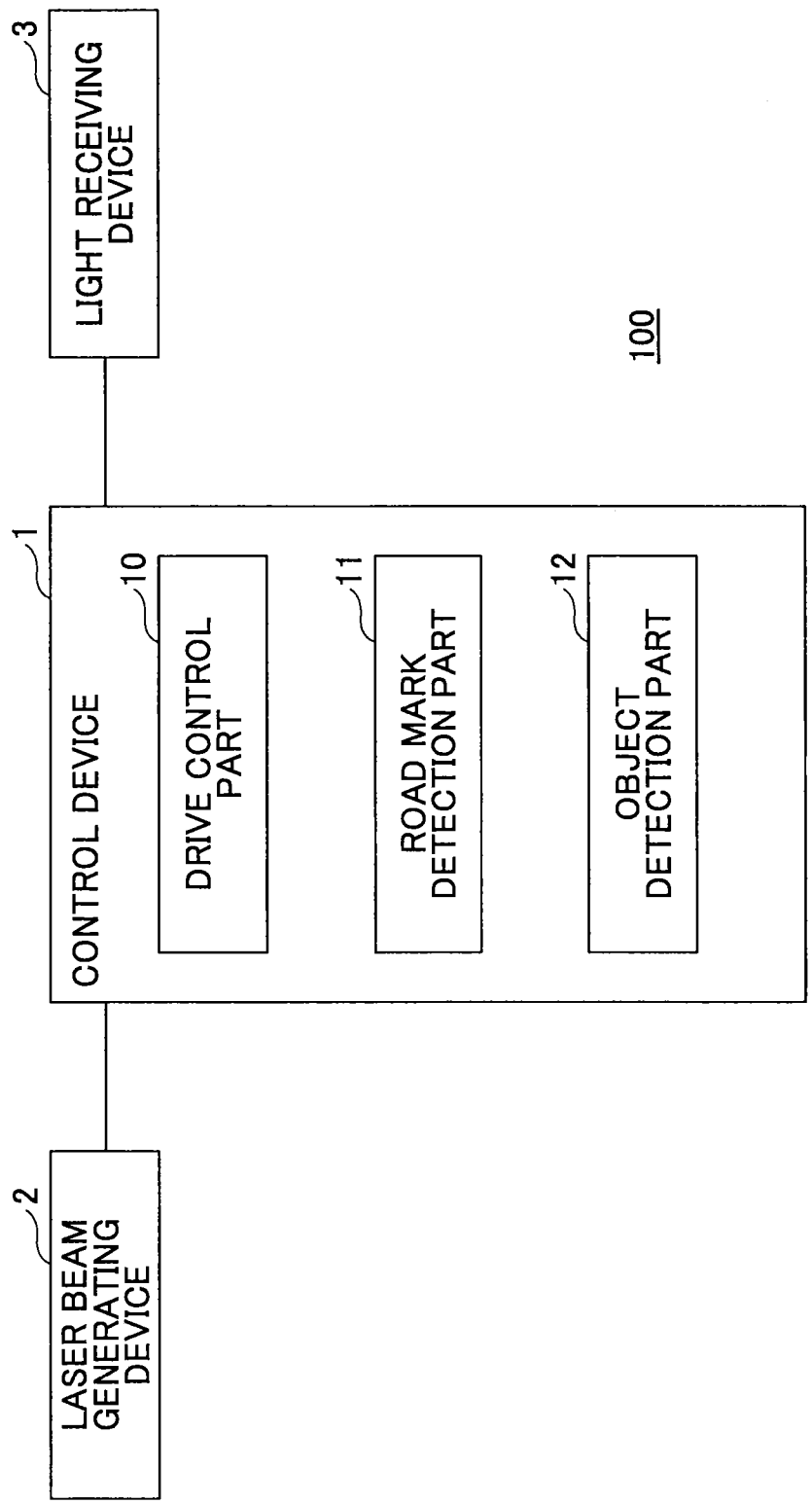
FIG. 1 is a functional block diagram illustrating a configuration example of a laser radar device according to an embodiment of the present invention.

FIG. 1 is a functional block diagram illustrating a configuration example of a laser radar device 100 according to an embodiment of the present invention. The laser radar device 100 detects an object (including a preceding vehicle, an obstacle, and the like) in front of a vehicle, and detects a road mark on a road surface. Specifically, the laser radar device 100 emits a pulsed laser beam in front of the vehicle, and receives a light reflected from an object or a road surface. Then, the laser radar device 100 detects an object or a road mark on a road surface in front of the vehicle by deriving an intensity of the reflected light from a reflecting point, a distance to the reflecting point, or the like. In the present embodiment, the laser radar device 100 includes, for example, a control device 1, a laser beam generating device 2, and a light receiving device 3.

The control device 1 is a computer including a CPU, a RAM, a ROM, a NVRAM, an input-output interface, and the like. For example, the control device 1 reads out a program corresponding to each of a drive control part 10, a road mark detection part 11, and an object detection part 12 from the ROM. Then, the control device 1 loads the program into the RAM and causes the CPU to run a process corresponding to each part.

The laser beam generating device 2 is configured to generate a measuring laser beam in response to a control signal from the control device 1.

Figure 2:
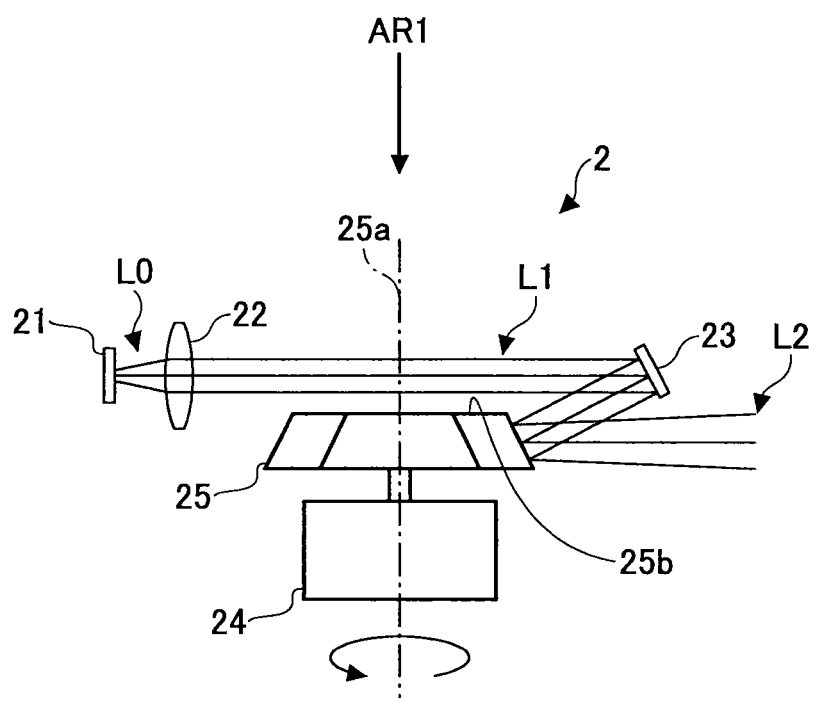
FIG. 2 is a side view of a configuration example of a laser beam generating device.

FIG. 2 is a side view of a configuration example of the laser beam generating device. In the present embodiment, the laser beam generating device 2 includes, for example, a laser diode 21, a collimator lens 22, a mirror 23, a polygonal mirror driving motor 24, and a polygonal mirror 25.

The laser diode 21 is a laser source (a laser diode) which emits a laser beam L0 in response to the control signal from the control device 1. For example, the laser diode 21 intermittently emits an infrared laser beam L0 in response to a pulse signal from the control device 1.

The collimator lens 22 is an optical element which converts the laser beam L0 emitted from the laser diode 21 to a collimated laser beam L1.

The mirror 23 is an optical element which reflects the collimated laser beam L1 from the collimator lens 22 to the polygonal mirror 25.

The polygonal mirror driving motor 24 is an electric motor which rotates the polygonal mirror 25 in response to the control signal from the control device 1. For example, the polygonal mirror driving motor 24 rotates the polygonal mirror 25 at a constant speed.

The polygonal mirror 25 is a rotating body on which plural reflective surfaces are formed on its outer periphery. The rotating body is rotated by the polygonal mirror driving motor 24. The polygonal mirror 25 receives at each of the plural reflective surfaces the collimated laser beam L1 reflected from the mirror 23. Then, the polygonal mirror 25 reflects again the collimated laser beam L1, and generates a measuring laser beam L2 emitted toward a predetermined direction.

A shape of each of plural reflective surfaces is decided so that a spread angle (in particular, a spread angle on a plane including a rotational axis 25a of the polygonal mirror 25 and a light axis of the measuring laser beam L2) of the measuring laser beam L2 emitted toward the predetermined direction may be a desired angle.

In the present embodiment, the polygonal mirror 25 has a regular hexagonal top surface 25b (see FIG. 4) viewed from a direction of the rotational axis 25a (a direction of an arrow AR1), and six reflective surfaces R1-R6 each having a 60 degrees width in a circumferential direction. However, the polygonal mirror 25 may have reflective surfaces whose number is other than six at its outer periphery. Widths (angle) of the reflective surfaces in a circumferential direction may be different from one another.

The light receiving device 3 is configured to receive a reflected light of the measuring laser beam emitted from the laser beam generating device 2 toward a predetermined direction. For example, a photo diode, which receives a reflected light and converts it to an electric signal, is employed as the light receiving device 3.

Figure 3:
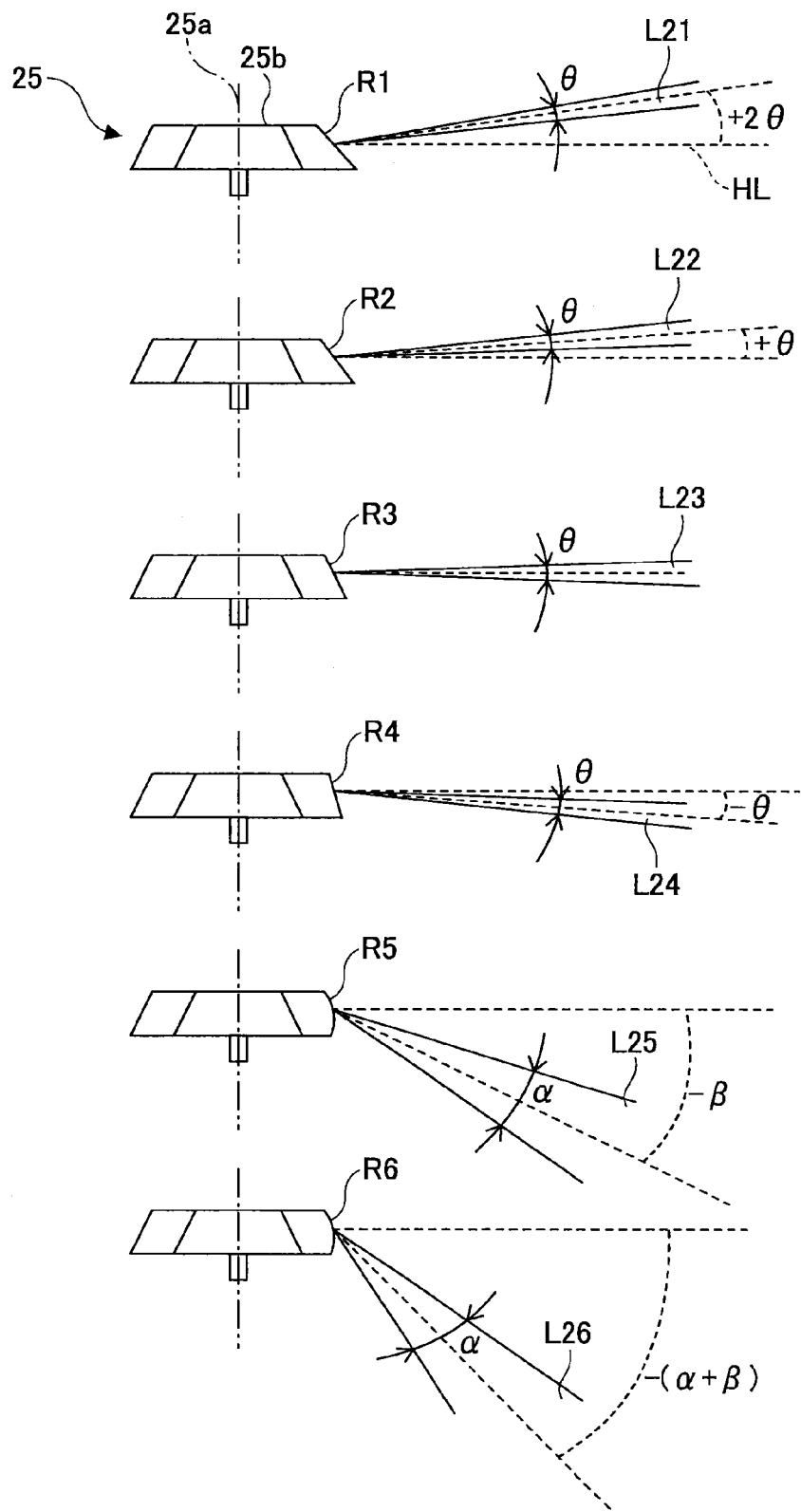
FIG. 3 is a side view of a polygonal mirror.
Figure 4:
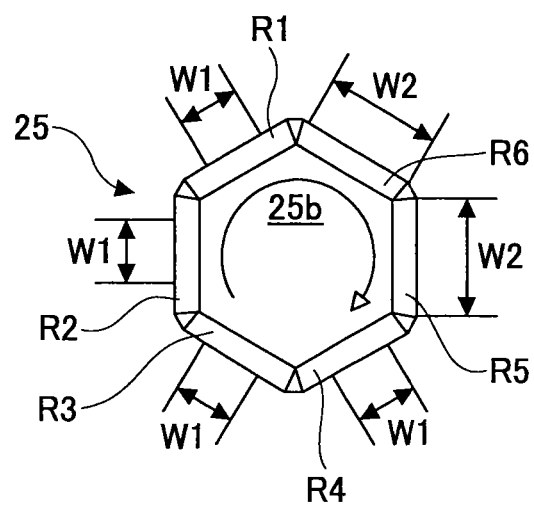
FIG. 4 is a top view of the polygonal mirror.
Figure 5:
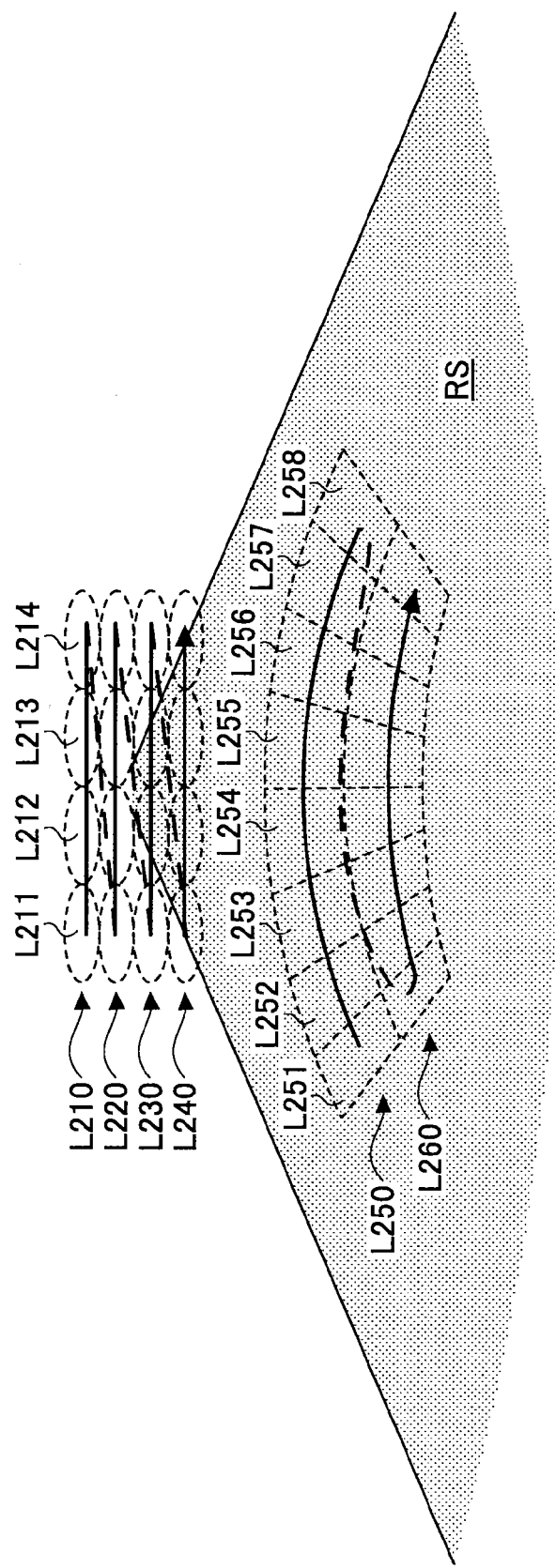
FIG. 5 is a diagram showing a front view in a traveling direction of a vehicle when the vehicle emits a measuring laser beam.
Figure 6:
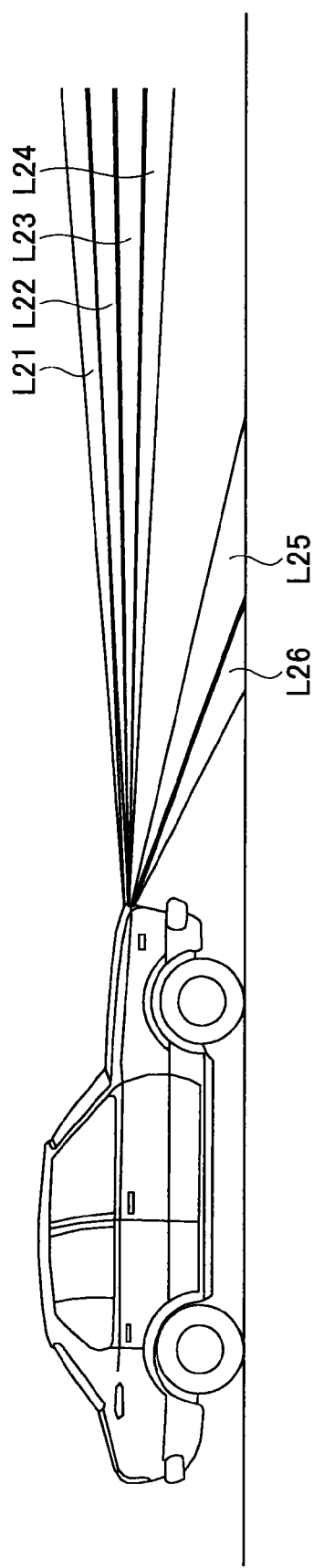
FIG. 6 is a side view of a vehicle when the vehicle emits a measuring laser beam.

Next, referring to FIGS. 3-6, a measuring laser beam L2 generated by the polygonal mirror 25 will be explained. FIG. 3 is a side view of the polygonal mirror 25. FIG. 3 shows measuring laser beams L21-L26 generated when the collimated laser beam L1 from the mirror 23 is reflected from the respective reflective surfaces R1-R6. FIG. 4 is a diagram of the polygonal mirror 25 viewed from a direction of an arrow AR1 in FIG. 2. FIG. 5 is a diagram showing a front view of a vehicle in a traveling direction of the vehicle when the measuring laser beam L2 is emitted. FIG. 6 is a side view of a vehicle when the measuring laser beam L2 is emitted.

As shown in FIG. 3, the reflective surface R1 reflects the collimated laser beam L1 from the mirror 23 to a front traveling direction of the vehicle, and generates a measuring laser beam L21 having a spread angle θ.

The measuring laser beam L21 has an optical axis which extends in a direction upwardly inclined at an angle 2θ with respect to a reference line (for example, a horizontal line) HL extending perpendicular to the rotational axis 25a.

The reflective surface R1 may be formed to include a convex curved surface so that it can generate a desired spread angle θ. Also, the reflective surface R1 may be formed to include plural plane surfaces which have different angles to the rotational axis 25a. The same goes for the reflective surfaces R2-R6.

Also, as shown in FIG. 4, the laser beam generating device 2 causes the laser diode 21 to intermittently emit an infrared laser beam L0 over a predetermined time period so that the collimated laser beam L1 can scan the reflective surface R1 of the polygonal mirror 25 rotating at a predetermined speed, over a width W1.

Also, as shown in FIG. 5, the measuring laser beam L21 illuminates an area L210 in a front traveling direction (i.e., illuminates each of four sub-areas L211-L214) predetermined number of times corresponding to the width W1 (four times in the present embodiment) while moving a direction of its optical axis from left to right at a predetermined height from a road surface RS in association with a rotation of the polygonal mirror 25.

Similarly, the reflective surface R2 reflects the collimated laser beam L1 to a front traveling direction of the vehicle, and generates a measuring laser beam L22 having a spread angle θ. The measuring laser beam L22 has an optical axis which extends in a direction upwardly inclined at an angle θ with respect to the reference line HL. Also, the laser beam generating device 2 causes the collimated laser beam L1 to get across the reflective surface R2 over a width W1. Consequently, the measuring laser beam L22 illuminates an area adjacent to the area illuminated by the measuring laser beam L21 in a front traveling direction of the vehicle by using four-times-irradiation corresponding to the width W1.

Also, the reflective surface R3 reflects the collimated laser beam L1 to a front traveling direction of the vehicle, and generates a measuring laser beam L23 having a spread angle θ. The measuring laser beam L23 has an optical axis which extends in a direction of the reference line HL. Also, the laser beam generating device 2 causes the collimated laser beam L1 to get across the reflective surface R3 over a width W1. Consequently, the measuring laser beam L23 illuminates an area adjacent to the area illuminated by the measuring laser beam L22 in a front traveling direction of the vehicle by using four-times-irradiation corresponding to the width W1.

Also, the reflective surface R4 reflects the collimated laser beam L1 to a front traveling direction of the vehicle, and generates a measuring laser beam L24 having a spread angle θ. The measuring laser beam L24 has an optical axis which extends in a direction downwardly inclined at an angle θ with respect to the reference line HL. Also, the laser beam generating device 2 causes the collimated laser beam L1 to get across the reflective surface R4 over a width W1. Consequently, the measuring laser beam L24 illuminates an area adjacent to the area illuminated by the measuring laser beam L23 in a front traveling direction of the vehicle by using four-times-irradiation corresponding to the width W1.

Also, the reflective surface R5 reflects the collimated laser beam L1 to a road surface, and generates a measuring laser beam L25 having a spread angle α (α>θ). The measuring laser beam L25 has an optical axis which extends in a direction downwardly inclined at an angle β (β>θ) with respect to the reference line HL. Also, the laser beam generating device 2 causes the collimated laser beam L1 to get across the reflective surface R5 over a width W2 (W2>W1). Consequently, the measuring laser beam L25 illuminates an area L250 on the road surface (i.e., illuminates each of eight sub-areas L251-L258) predetermined number of times corresponding to the width W2 (eight times in the present embodiment).

Also, the reflective surface R6 reflects the collimated laser beam L1 to a road surface, and generates a measuring laser beam L26 having a spread angle α. The measuring laser beam L26 has an optical axis which extends in a direction downwardly inclined at an angle α+β with respect to the reference line HL. Also, the laser beam generating device 2 causes the collimated laser beam L1 to get across the reflective surface R6 over a width W2. Consequently, the measuring laser beam L26 illuminates an area adjacent to the area illuminated by the measuring laser beam L25 on the road surface by using eight-times-irradiation corresponding to the width W2.

In this way, in the present embodiment, the reflective surfaces R1-R4 of the polygonal mirror 25 constitute a first laser emission part which generates a measuring laser beam emitted toward a front traveling direction, and the reflective surfaces R5 and R6 of the polygonal mirror 25 constitute a second laser emission part which generates a measuring laser beam emitted toward a road surface.

Also, in the present embodiment, the measuring laser beams L21-L24 are used to measure a position of an object in a front traveling direction, and the measuring laser beams L25 and L26 are used to measure a position of a road mark on a road surface.

Also, in the present embodiment, for convenience of explanation, a single scan from left to right by each of the measuring laser beams L21-L24 includes four times of irradiation, each scan proceeding from top to bottom. Also, a single scan from left to right by each of the measuring laser beams L25 and L26 includes eight times of irradiation, a scan by the measuring laser beam L26 is performed at nearer side (closer to the vehicle) than a scan by the measuring laser beam L25.

However, in practice, each of the scans by the measuring laser beam L2 includes a larger number of irradiations. Also, the number of irradiations can be set individually. Also, scans in a front traveling direction (scans by the measuring laser beams L21-L24 in the present embodiment) may proceed from bottom to top, or may be in a random manner independent of a traveling direction. Similarly, scans on a road surface (scans by the measuring laser beams L25 and L26 in the present embodiment) may proceed in a direction away from the vehicle, or may be a random manner independently of a traveling direction.

Also, in the present embodiment, a scan by each of the measuring laser beams L21-L26 proceeds from left to right. However, it may proceed from right to left, proceed vertically (from top to bottom or from bottom to top), or proceed diagonally.

Also, in the present embodiment, the measuring laser beam scans the front traveling direction four times and the road surface two times in a series of irradiation process. However, it may employ other combinations of the number of scans such as, for example, it may scan three times for each of the front traveling direction and the road surface.

Also, in the present embodiment, the laser beam generating device 2 generates measuring laser beams so that areas illuminated by each of the measuring laser beams may not overlap. However, the laser beam generating device 2 may generate measuring laser beams so that areas illuminated by each of the measuring laser beams may partially overlap, or the areas may be spaced at predetermined intervals.

Referring again to FIG. 1, a variety of functional elements in the control device 1 will be explained.

The drive control part 10 is a functional element configured to control driving of the laser beam generating device 2. For example, the drive control part 10 outputs a control signal to the laser diode 21 and to the polygonal mirror driving motor 24, and causes the laser beam generating device 2 to operate at a desired state.

Specifically, the drive control part 10 properly synchronizes an emission timing of the laser beam L0 by the laser diode 21 and a rotational speed of the polygonal mirror 25 by the polygonal mirror driving motor 24.

The road mark detection part 11 is a functional element configured to detect a road mark on a road surface. For example, the road mark detection part 11 detects based on an output of the light receiving device 3 a road mark by deriving an intensity of a reflected light, a distance between the laser beam generating device 2 and a reflecting point, and a direction of the reflecting point viewed from the laser beam generating device 2.

Also, the road mark detection part 11 detects a road mark on a road surface by receiving at the light receiving device 3 a reflected light of a measuring laser beam emitted toward the road surface.

Also, a "road mark" represents a mark on a road surface. For example, the road mark includes a road boundary line (for example, a continuous line or a discontinuous line) painted on a road surface, a raised marker on a road surface (for example, Botts' dots or a Cat's eye), or the like.

Also a "reflecting point" represents a point corresponding to a position where each of the measuring laser beams L2 reflects. For example, the reflecting point corresponds to a point on each optical axis of the measuring laser beams L2 emitted toward a road surface.

Specifically, the road mark detection part 11 calculates a distance between the laser beam generating device 2 and the reflecting point (hereinafter referred to as "reflecting point distance") based on a time from a time point when the laser diode 21 emits the laser beam L0 to a time point when the light receiving device 3 receives a light, and the speed of light.

Also, the road mark detection part 11 derives an irradiation direction of the measuring laser beam L2 and then a direction of the reflecting point based on the emission time point and a drive state of the laser beam generating device 2 (a rotational state of the polygonal mirror 25).

Subsequently, if an intensity of a reflected light is equal to or greater than a predetermined value and if a height of a reflecting point calculated on a corresponding reflecting point distance is nearly identical to a height of a road surface, the road mark detection part 11 extracts the reflecting point relating to the reflected light as a reflecting point on a road mark (hereinafter referred to as "efficient reflecting point").

Subsequently, the road mark detection part 11 calculates a coordinate value of the efficient reflecting point in a two-dimensional orthogonal coordinate system where an origin corresponds to a position of the laser beam generating device 2, an X-axis corresponds to a distance in a vehicle width direction, and a Y-axis corresponds to a distance in a vehicle traveling direction.

Subsequently, the road mark detection part 11 extracts coordinate values of plural efficient reflecting points by repeating the above process, and decides a position of a road boundary line by calculating each of the coordinate values Also, the road mark detection part 11 streamlines a detection of a position of a road boundary line at the present time based on a displacement of an occupant's vehicle per unit time and a position of a road boundary line decided a unit time ago.

Specifically, the road mark detection part 11 estimates a displacement of an occupant's vehicle during a unit time based on an output of a vehicle speed sensor, a steering angle sensor, or the like (not shown). Then, the road mark detection part 11 displaces the position of the road boundary line decided a unit time ago to a position on the coordinate system at the present time.

On that basis, the road mark detection part 11 extracts reflecting points located near the displaced road boundary line out of reflecting points at the present time in order to reduce a load on an extracting process of efficient reflecting points.

Also, the road mark detection point 11 may derive values of parameters $a_0$, $a_1$, $a_2$ based on a coordinate value (x, y) of an efficient reflecting point and a predetermined quadric curve model formula ($x=a_0+a_1*y+a_2*y2$). The parameter $a_0$ represents a displacement [meter] of an occupant's vehicle in relation to a centerline of a lane in a vehicle width direction. The parameter $a_1$ represents an angle [radian] of a vehicle traveling direction in relation to a direction of a lane. The parameter $a_2$ represents a curvature [1/meter] of a lane.

The object detection part 12 is a functional element configured to detect an object existing in a front traveling direction of a vehicle. For example, as in the process by the road mark detection part 11, the object detection part 12 detects an object by deriving, based on an output of the light receiving device 3, an intensity of a reflected light, a distance between the laser beam generating device 2 and a reflecting point, and a direction of the reflecting point viewed from the laser beam generating device 2.

Also, the object detection part 12 detects an object in a front traveling direction of a vehicle by receiving at the light receiving device 3 a reflected light of a measuring laser beam emitted toward the front traveling direction.

Next, referring to FIGS. 7 and 8, an example of an area illuminated by the measuring laser beam emitted by the laser beam generating device 2 toward a road surface will be explained. Each of FIGS. 7 and 8 shows a composite diagram which combines a side view of a vehicle which emits a measuring laser beam and a top view thereof.

Figure 7:
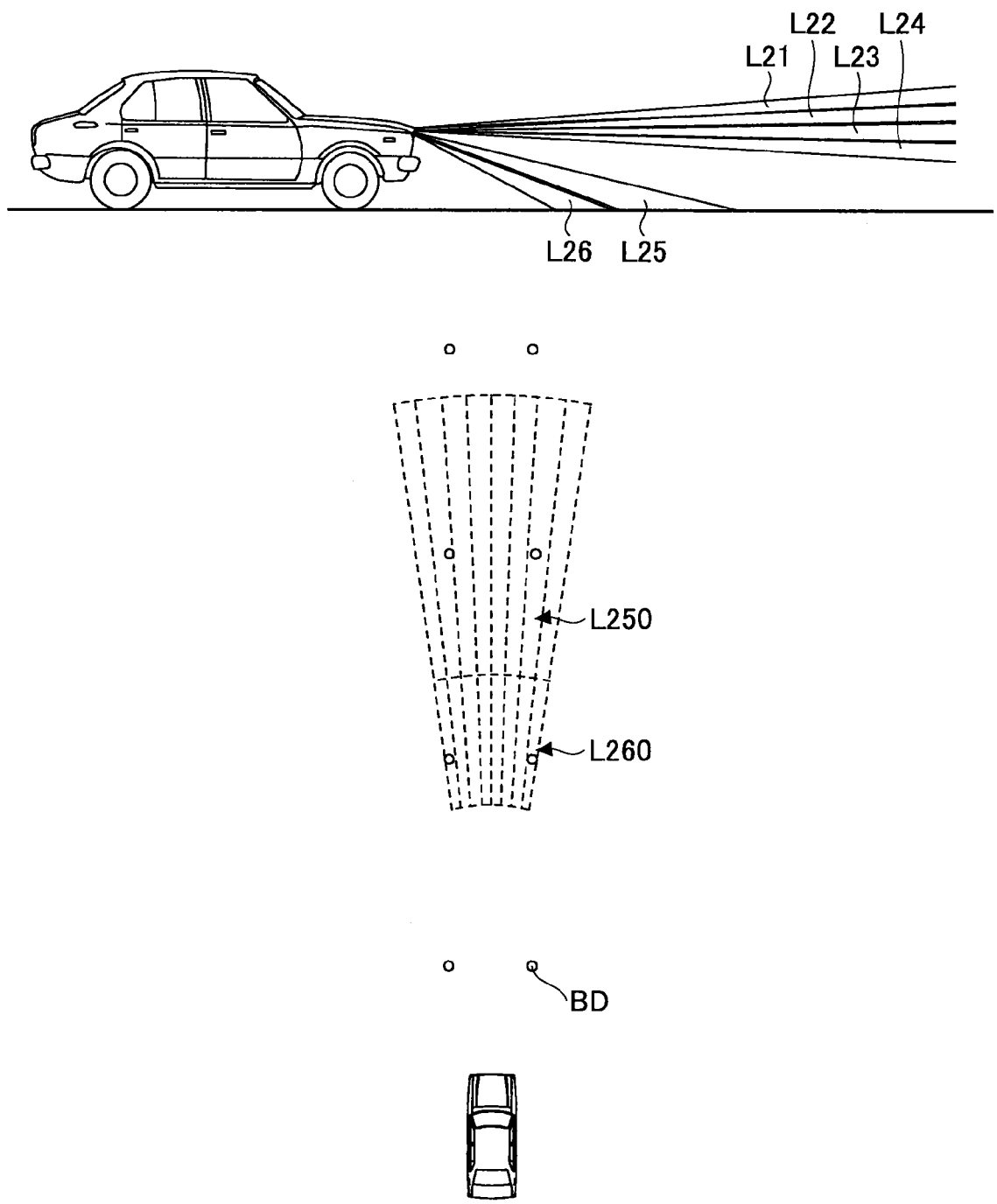
FIG. 7 is a diagram illustrating an example of an area irradiated by a measuring laser beam which a laser beam generating device emits toward a road surface.

FIG. 7 shows irradiated areas L250, L260 when the measuring laser beams L25, L26 are emitted toward a road surface. The measuring laser beams L25, L26 have the spread angle α (α>θ) which is larger than the spread angle θ of the measuring laser beams L21-L24 emitted toward the front traveling direction. The measuring laser beams L21-L26 in FIG. 7 correspond to the measuring laser beams L21-L26 in FIG. 3. Also, the measuring laser beams L21-L26 in FIG. 7 have optical axes which incline at an angle +2θ, +θ, ±0, −θ, −β, −(α+β) with respect to the horizontal line HL as the reference line, respectively.

Figure 8:
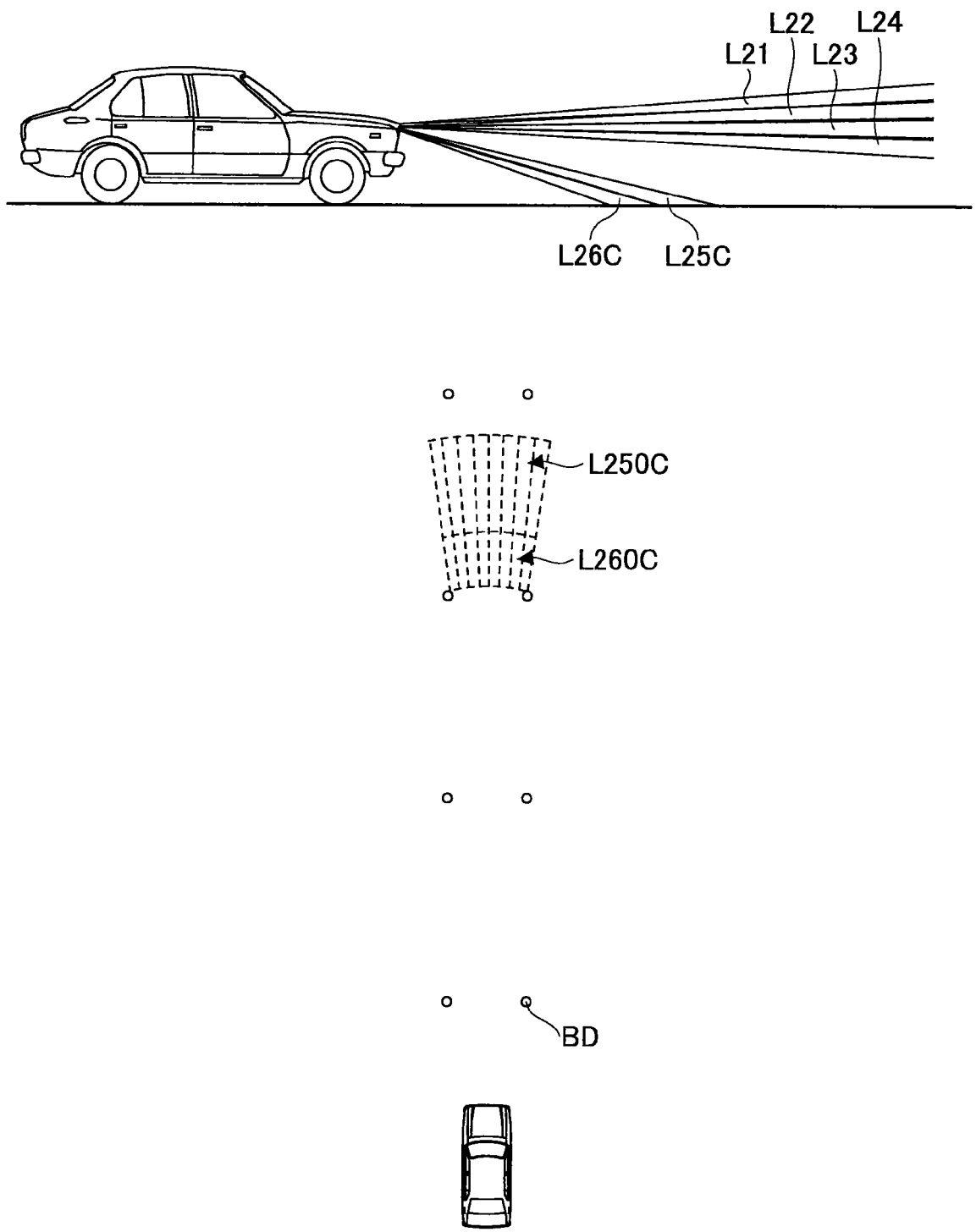
FIG. 8 is a diagram illustrating another example of an area irradiated by a measuring laser beam which a laser beam generating device emits toward a road surface.

Also, FIG. 8 shows irradiated areas L250C, L260C when the measuring laser beams L25C, L26C are emitted toward a road surface. The measuring laser beams L25C, L26C have the spread angle θ which is the same as the spread angle θ of the measuring laser beams L21-L24 emitted toward the front traveling direction.

The measuring laser beams L25C, L26C in FIG. 8 have optical axes which downwardly incline at an angle 3θ, 4θ with respect to the horizontal line HL as the reference line, respectively, and form on the road surface the irradiation areas L250C, L260C smaller than the irradiation areas L250, L260 in FIG. 7. Consequently, if a road mark is comprised of Botts' dots BD as shown, the laser beam generating device 2 may create a situation where any of the irradiation areas L250C, L26C cannot cover the Botts' dots BD.

In contrast, the measuring laser beams L25, L26 in FIG. 7 have optical axes which downwardly incline at angles β, α+β with respect to the horizontal line HL as the reference line, respectively (see FIG. 3), and form on the road surface the irradiated areas L250, L260 greater than the irradiated areas 250C, 260C in FIG. 7.

Consequently, even if a road mark is comprised of Botts' dots BD as shown, the laser beam generating device 2 can include the Botts' dots BD in the irradiation areas L250, L260 more reliably.

In this way, the laser radar device 100 emits toward a road surface the measuring laser beams L25, L26 having the spread angle α larger than the spread angle θ of the measuring laser beams L21-L24 emitted toward a front traveling direction. As a result, the laser radar device 100 can include a road mark (the Botts' dots BD) as an object to be detected in the irradiation areas more reliably, and improve a detection ratio of the road mark (the Botts' dots BD). The detection ratio of the road mark represents the probability that the road mark is included in the irradiation areas.

Also, the laser radar device 100 makes the spread angle of the measuring laser beams L25, L26 emitted toward a road surface larger than the spread angle θ of the measuring laser beams L21-L24 emitted toward the front traveling direction. In this way, the laser radar device 100 can reduce the number of irradiations to the road surface per unit time without narrowing the irradiation areas on the road surface and without decreasing a detection ratio of a road mark. Consequently, if there is a limit to the number of irradiations per unit time, the laser radar device 100 can allocate a larger number of irradiations to the measuring laser beam emitted toward the front traveling direction. This leads to a smaller spread angle of the measuring laser beam emitted toward the front traveling direction. Eventually, the laser radar device 100 can improve a detection performance (a resolution performance) of an object in the front traveling direction.

Next, referring to FIG. 9, another example of an irradiation area of a measuring laser beam emitted by the laser beam generating device 2 toward a road surface will be explained. As in FIGS. 7 and 8, FIG. 9 shows a composite diagram which combines a side view of a vehicle which emits the measuring laser beam and a top view thereof. Also, FIG. 9 shows that, instead of the Botts' dots BD in FIGS. 7 and 8, discontinuous boundary lines PM are painted on the road surface.

In FIG. 9, unlike in the case of FIGS. 7 and 8, the laser beam generating device 2 allocates three scans each to the measuring laser beams emitted toward the front traveling direction and the measuring laser beams emitted toward the road surface. Then, the laser beam generating device 2 emits measuring laser beams L21, L22, L23 toward the front traveling direction, and emits measuring laser beams L24N, L25N, L26N toward the road surface.

The spread angles of each of the measuring laser beams L24N, L25N, L26N emitted toward the road surface are set to be a value larger than the spread angle θ of the measuring laser beams L21, L22, L23 emitted toward the front traveling direction.

Also, the spread angles of each of the measuring laser beams L24N, L25N, L26N are set so that lengths of each of irradiation areas L240N, L250N, L260N on the road surface may be nearly identical to a common length D1. Consequently, the spread angle of the measuring laser beam L26N becomes the largest, and followed by the spread angles of the measuring laser beams L25N, L24N in that order.

The length D1 is, for example, set to a length longer than or equal to 5 meters which correspond to a length of an individual discontinuous boundary line PM and also correspond to a length between two discontinuous boundary lines PM. If the length D1 is 5 meters, the spread angles of the measuring laser beams L24N, L25N, L26N are, for example, set to be 2 degrees, 5 degrees, 15 degrees, respectively.

In this way, the laser radar device 100 can include a discontinuous road mark (the discontinuous boundary line PM) in the irradiation areas more reliably and improve a detection ratio of the discontinuous road mark (the discontinuous boundary line PM) by emitting the measuring laser beams L24N-L26N toward the road surface. The measuring laser beams L24N-L26N have the spread angles larger than the spread angle θ of the measuring laser beams L21-L23 emitted toward the front traveling direction.

Also, the laser radar device 100 makes the spread angles of the measuring laser beams L24N-L26N emitted toward the road surface larger than the spread angle θ of the measuring laser beams L21-L23 emitted toward the front traveling direction. Consequently, if there is a limit to the number of irradiations per unit time, the laser radar device 100 can allocate a larger number of irradiations to the measuring laser beam emitted toward the front traveling direction. This leads to a smaller spread angle of the measuring laser beam emitted toward the front traveling direction. Eventually, the laser radar device 100 can improve a detection performance (a resolution performance) of an object in the front traveling direction.

Also, the laser radar device 100 emits the measuring laser beams L24N-L26N so that each length in an irradiation direction of the irradiation areas L240N-L260N illuminated by the measuring laser beams L24N-L26N emitted toward the road surface may be longer than or equal to the interval between the discontinuous road marks. In this way, the laser radar device 100 can include the discontinuous road mark in each of the irradiation areas and improve a detection ratio of the discontinuous road mark.

Figure 10:
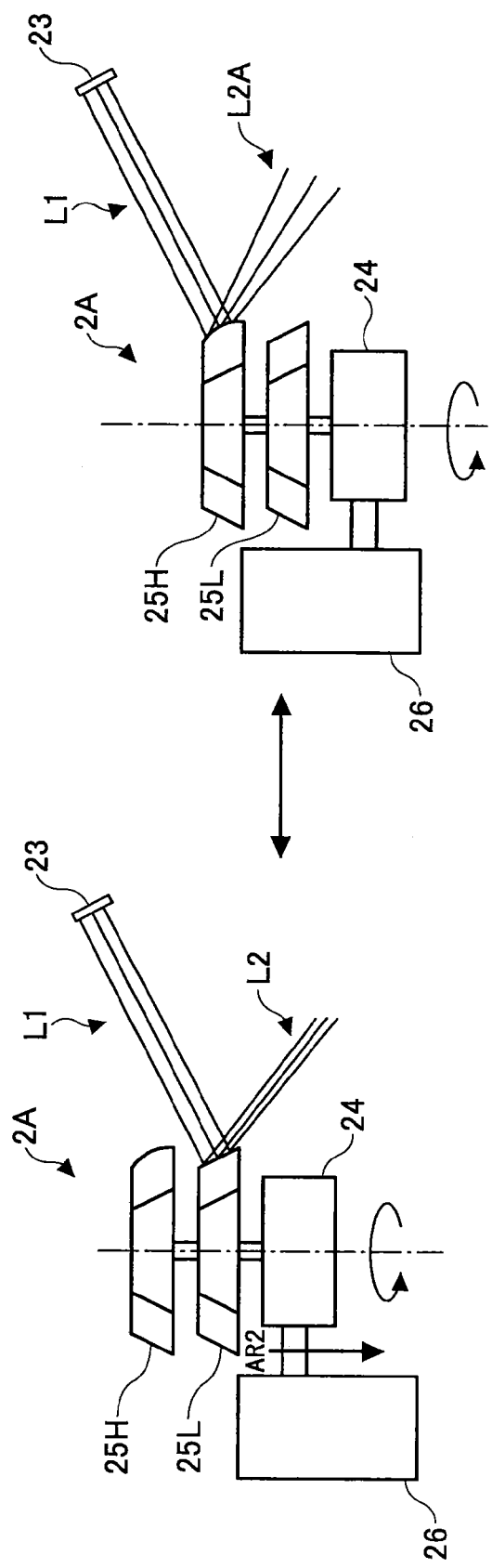
FIG. 10 is a side view of another configuration example of a laser beam generating device.

Next, referring to FIG. 10, another configuration example of the laser beam generating device will be explained. In FIG. 10, the laser beam generating device 2A is different from the laser beam generating device 2 in FIG. 2 in that it has two switchable polygonal mirrors 25H, 25L and a linear motor 26 for switching. However, both devices are common in other respects.

Normally, the laser radar device 100 generates the measuring laser beam L2 by causing each of the reflecting surfaces of the polygonal mirror 25L to reflect the collimated laser beam L1 reflected from the mirror 23.

Each of the reflecting surfaces of the polygonal mirror 25L is configured so that the spread angle of the measuring laser beam emitted toward the road surface may become the same as the spread angle of the measuring laser beam emitted toward the front traveling direction and so that the number of scans by the measuring laser beam emitted toward the front traveling direction and by the measuring laser beam emitted toward the road surface may become three scans, respectively.

Also, the control device 1 of the laser radar device 100 outputs a control signal to the laser beam generating device 2A if a switching instruction by an operator is entered or if a detection ratio of a road mark falls below a predetermined level.

The laser beam generating device 2A moves the polygonal mirror driving motor 24, the polygonal mirror 25H, and the polygonal mirror 25L in a direction of an arrow AR2 by using the linear motor 26 in response to the control signal from the control device 1. Consequently, the laser beam generating device 2A generates a measuring laser beam L2A so that the collimated laser beam L1 may fall on reflecting surfaces of the polygonal mirror 25H instead of falling on reflecting surfaces of the polygonal mirror 25L.

Each of the reflecting surfaces of the polygonal mirror 25H is configured so that the spread angle of the measuring laser beam emitted toward the road surface may become larger than the spread angle of the measuring laser beam emitted toward the front traveling direction and so that the number of scans by the measuring laser beam emitted toward the front traveling direction (for example, four scans) becomes greater than the number of scans by the measuring laser beam emitted toward the road surface (for example, two scans).

In this way, for example if a road mark is continuous, the laser radar device 100 can enhance a detection sensitivity to the road mark by making the spread angle of the measuring laser beam emitted toward the road surface relatively smaller and by increasing a power density in the irradiated area.

Also, for example if a road mark is discontinuous, the laser radar device 100 can improve a detection ratio of the road mark by making the spread angle of the measuring laser beam emitted toward the road surface relatively larger and by expanding the irradiated area. In this case, the laser radar device 100 can allocate a larger number of irradiations to the measuring laser beam emitted toward the front traveling direction and make its spread angle relatively smaller. Then, the laser radar device 100 can improve a detection performance (resolution performance) of an object in the front traveling direction.

The laser beam generating device 2A may have an actuator for switching an inclined angle of the mirror 23 instead of the linear motor 26. Then, the laser beam generating device 2A may switch the inclined angle of the mirror 23 in response to the control signal from the control device 1. In this case, the laser beam generating device 2A can switch the inclined angle of the reflecting surface, on which the collimated laser beam L1 falls, between an inclined angle corresponding to the polygonal mirror 25L and an inclined angle corresponding to the polygonal mirror 25H. In this way, the laser beam generating device 2A can achieve the same effect as in the case where the linear actuator 26 is used.

Preferable embodiments of the present invention have been described in detail. However, the present invention is not limited to the above embodiments. Various changes and modifications to the above embodiments may be made without departing from the scope of the present invention.

For example, in the above embodiments, the reflecting surfaces of the polygonal mirror are formed so that each width (each circumferential angle) may become identical. However, the reflecting surfaces may be formed to have widths different from one another so that each of the reflecting surfaces can achieve a desired scanning width of the measuring laser beam. In this case, the laser beam generating device does not need to interrupt a generation of the measuring laser beam (an emission of the laser beam by the laser diode) during switching the reflecting surfaces. Consequently, the laser beam generating device can simplify a process relating to the generation of the measuring laser beam.

EXPLANATION OF REFERENCE SIGNS

1 Control device
2, 2A Laser beam generating device
3 Light receiving device
10 Drive control part
11 Road mark detection part
12 Object detection part
21 Laser diode
22 Collimator lens
23 Mirror
24 Polygonal mirror driving motor
25, 25H, 25L Polygonal mirror
25a Rotational axis of polygonal mirror
25b Top surface of polygonal mirror
26 Linear motor
100 Laser radar device
L0 Laser beam emitted by laser diode
L1 Collimated laser beam generated by collimator lens
L2, L2A Measuring laser beam
L21-L26 Measuring laser beam
L25C, L26C Measuring laser beam
L24N-L26N Measuring laser beam
L210-L260 Area illuminated by single scan
L250C, L260C Area illuminated by single scan
L240N-L260N Area illuminated by single scan
L211-L214, L251-L258 Area illuminated by single scan
R1-R6 Reflective surface
RS Road surface

The invention claimed is:

1. A laser radar device mounted on a vehicle, comprising:
a first laser emission part configured to generate a measuring laser beam by using a laser beam emitted from a laser source and to illuminate a predetermined area in a front traveling direction; and
a second laser emission part configured to generate a measuring laser beam by using the laser beam emitted from the laser source and to illuminate a predetermined area on a road surface;
a road-surface beam spread angle, viewed from a side of the vehicle, of the measuring laser beam generated by the second laser emission part is vertically larger than a front beam spread angle, viewed from a side of the vehicle, of the measuring laser beam generated by the first laser emission part,
a number of irradiations per unit time by the laser radar device is a sum of a number of irradiations per unit time by the first laser emission part and a number of irradiations per unit time by the second laser emission part,
the number of irradiations per unit time by the laser radar device allocated to the first laser emission part for the first laser emission part to illuminate the predetermined area in the front traveling direction increases with an increase in the road-surface beam spread angle, and
an illuminated area per unit time by the second laser emission part adopting a predetermined scan-line number is larger than or equal to an illuminated area per unit time by the second laser emission part which generates a measuring laser beam having a road-surface beam spread angle which is vertically equal to the front beam spread angle and adopts a scan-line number which is larger than the predetermined scan-line number.

2. The laser radar device according to claim 1,
the second laser emission part illuminates the predetermined area on the road surface by more than one scan,
the beam spread angle, viewed from the side of the vehicle, of the measuring laser beam generated by the second laser emission part is an angle which makes each length of illuminated areas on the road surface by each scan of the measuring laser beam nearly equal, and
a length of the illuminated area is set to be a length longer than or equal to a predetermined interval of a road mark which is repeated at the predetermined interval.

3. The laser radar device according to claim 1,
the first laser emission part and the second laser emission part respectively generate the measuring laser beams by causing each of reflecting surfaces on a rotating polygonal mirror to reflect the laser beam emitted from the laser source, and
the second laser emission part generates the measuring laser beam by causing a convex reflecting surface to reflect the laser beam emitted from the laser source.

4. The laser radar device according to claim 1,
the first laser emission part generates the measuring laser beam to measure a position of the vehicle or an obstacle in the front traveling direction, and
the second laser emission part generates the measuring laser beam to measure a position of a road mark on the road surface.

* * * * *